(12) United States Patent
Ishida et al.

(10) Patent No.: US 6,539,836 B2
(45) Date of Patent: Apr. 1, 2003

(54) PISTON FOR INTERNAL COMBUSTION ENGINE

(75) Inventors: Junichi Ishida, Saitama (JP); Hiroyuki Uchida, Saitama (JP); Kazuaki Namiki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/875,097

(22) Filed: Jun. 7, 2001

(65) Prior Publication Data

US 2002/0007730 A1 Jan. 24, 2002

(30) Foreign Application Priority Data

Jun. 7, 2000  (JP) ......................................... 2000-171320

(51) Int. Cl.⁷ .................................................. F16J 1/04
(52) U.S. Cl. .............................. 92/158; 92/159; 92/208
(58) Field of Search .......................... 92/158, 159, 208, 92/186; 123/193.6

(56) References Cited

U.S. PATENT DOCUMENTS 4,363,293 A * 12/1982 Munoz et al. ................ 92/186
5,086,736 A * 2/1992 Wiemann ..................... 92/159

FOREIGN PATENT DOCUMENTS

| DE | 2533556 A1 | * 1/1977 |
| DE | 285205 A1 | * 10/1988 |
| DE | 464626 A1 | * 1/1992 |
| JP | U6045843 | 3/1985 |

* cited by examiner

Primary Examiner—Edward K. Look
Assistant Examiner—Thomas E. Lazo
(74) Attorney, Agent, or Firm—Birch, Stewart, Kolasch & Kolsch, LLP

(57) ABSTRACT

An internal combustion engine for enhancing a heat radiation property of combustion gas, can sufficiently secure strength thereof relative to combustion gas, and a weight reduction thereof can be realized. A piston for an internal combustion engine is constituted of a head part, a cylindrical skirt part extending from a lower part of the head part. A pair of pin boss parts are formed on both opposing side walls to each other of the skirt part. A plurality of recessed parts, the cross sections thereof being presented as smooth circular arcs, are formed on a surface on an opposing side to a surface facing to a combustion chamber of the head part, that is, to a reverse face.

21 Claims, 3 Drawing Sheets

BACKGROUND ART

PISTON FOR INTERNAL COMBUSTION ENGINE

BACKGROUND OF THE INVENTION

1. Field of the Invention

The present invention relates to a piston for an internal combustion engine for efficiently radiating heat from a head disposed inside of a combustion chamber.

2. Description of Background Art

A piston for an internal combustion engine is formed with a plurality of ribs on a reverse face (that is, a surface on the opposing side to the surface facing to the combustion chamber) of a head part for radiating heat generated when an air-fuel mixture is burned inside the combustion chamber to a crankcase side. Further, a piston must be provided for maintaining strength with respect to a combustion gas pressure.

As an example of the piston for an internal combustion engine, there is proposed Japanese Unexamined Utility Model Patent Publication S60-45643 "PISTON FOR ENGINE". The construction of this piston will be explained in detail with reference to FIG. 5 which illustrates a sectional view illustrating a piston for a conventional internal combustion engine. A piston 100 is provided with a cylindrical skirt part 102 to a lower part of a head part 101, formed with a pair of pin boss parts 103, 103 on both opposing side walls to each other of the skirt part 102, and a plurality of pieces of ribs 106 are provided on a surface 101a on a side opposing to a combustion chamber 105 of the head part 101.

A heat radiation property is enhanced by being provided with a plurality of pieces of the ribs 106 and by enlarging a surface area of the head part 101. In addition to that, by reinforcing the head part 101 with a plurality of pieces of the ribs 106, a wall thickness in the head part is thinned, and a weight reduction of the piston is realized. In this way, a fuel economy and the output of the internal combustion engine can be enhanced.

However, since the ribs 106 extend substantially at right angles downwardly from a head part, connecting parts of proximal end parts 106a of the ribs 106 with the head part 101 are formed with recesses substantially at an angle of 90 degrees. Therefore, stress is liable to be concentrated on the connecting part of the proximal end parts 106a of the ribs 106 with the head part 101.

Eventually, according to various types of an internal combustion engine, there is the possibility of cracks being generated in the connecting part of the proximal end parts 106a of the ribs 106 with the head part 101. Accordingly, in order to prevent the crack from being generated, for example, a piston 100 for an internal combustion engine is required to be formed from a quality of material that is high in a tensile stress, and that causes a factor to increase in cost.

SUMMARY AND OBJECTS OF THE INVENTION

Thus, an object of the present invention is to provide a piston for an internal combustion engine having a head part being enhanced in heat radiating property thereof while sufficiently maintaining the strength of the head part, and the weight reduction of the piston.

A piston for an internal combustion engine is constituted of a head part, a cylindrical skirt part ranged to a lower part of the head part, a pair of pin boss parts formed on both opposing side walls to each other of the skirt part, wherein, a plurality of pieces of the recessed parts, a cross section thereof being presented in a smooth circular arc, are formed in a surface on an opposing side to a surface facing to a combustion chamber of the head part described above.

A plurality of pieces of the recessed parts, the cross sections thereof being presented with smooth circular arcs, are formed on a reverse face of the head part. With this contrivance, a heat radiation property is enhanced by enlarging a surface area of the reverse face of the head part. In addition to that, the weight of the head part is lightened by forming a plurality of pieces of the recessed parts on the reverse face of the head part wherein a weight reduction of the piston for an internal combustion engine is realized.

Further, by forming the cross section of the recessed part with a smooth circular arc, when a combustion gas pressure is operated to the head part, stress is prevented from concentrating on the recessed part.

The outer peripheral part of the head part is a portion arranged to a skirt part, a wall thickness in the neighborhood of the outer peripheral part is thicker than the center of the head part. Accordingly, by forming the recessed parts in the neighborhood of the outer peripheral part of the head part, a wall thickness of the outer peripheral part is set close to a wall thickness of a central part.

By arranging the recessed parts in the shape of the lattice in the neighborhood of the outer peripheral part of the head part, a plurality of pieces of recessed parts are arranged efficiently in the neighborhood of the outer peripheral part. Thus, a wall thickness in the neighborhood of the outer peripheral part of the head part can be set close to a wall thickness in the center of the head part. Further, a surface area of the head part can be increased.

A width of a recessed part is denoted by the letter c, a height thereof is denoted by the letter h, a ratio between the width c and the height h, that is, h/c is set in a range of 0.15–0.25.

When the ratio h/c is smaller than 0.15, it becomes difficult to sufficiently enlarge a surface area of a head part and it is difficult to enhance heat radiation. Thus the ratio h/c is set equal to or more than 0.15, the heat radiation is tried to be enhanced by sufficiently enlarging the surface area of the head part.

Further, when the ratio h/c exceeds 0.25, it becomes difficult to form a cross section of the recessed part in a shape that is a smooth circular arc, stress can not be prevented from being concentrated. Thus, when the ratio h/c is set equal to or smaller than 0.25, by forming the cross section of the recessed part in a shape being presented in a smooth circular arc, stress is prevented from being concentrated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
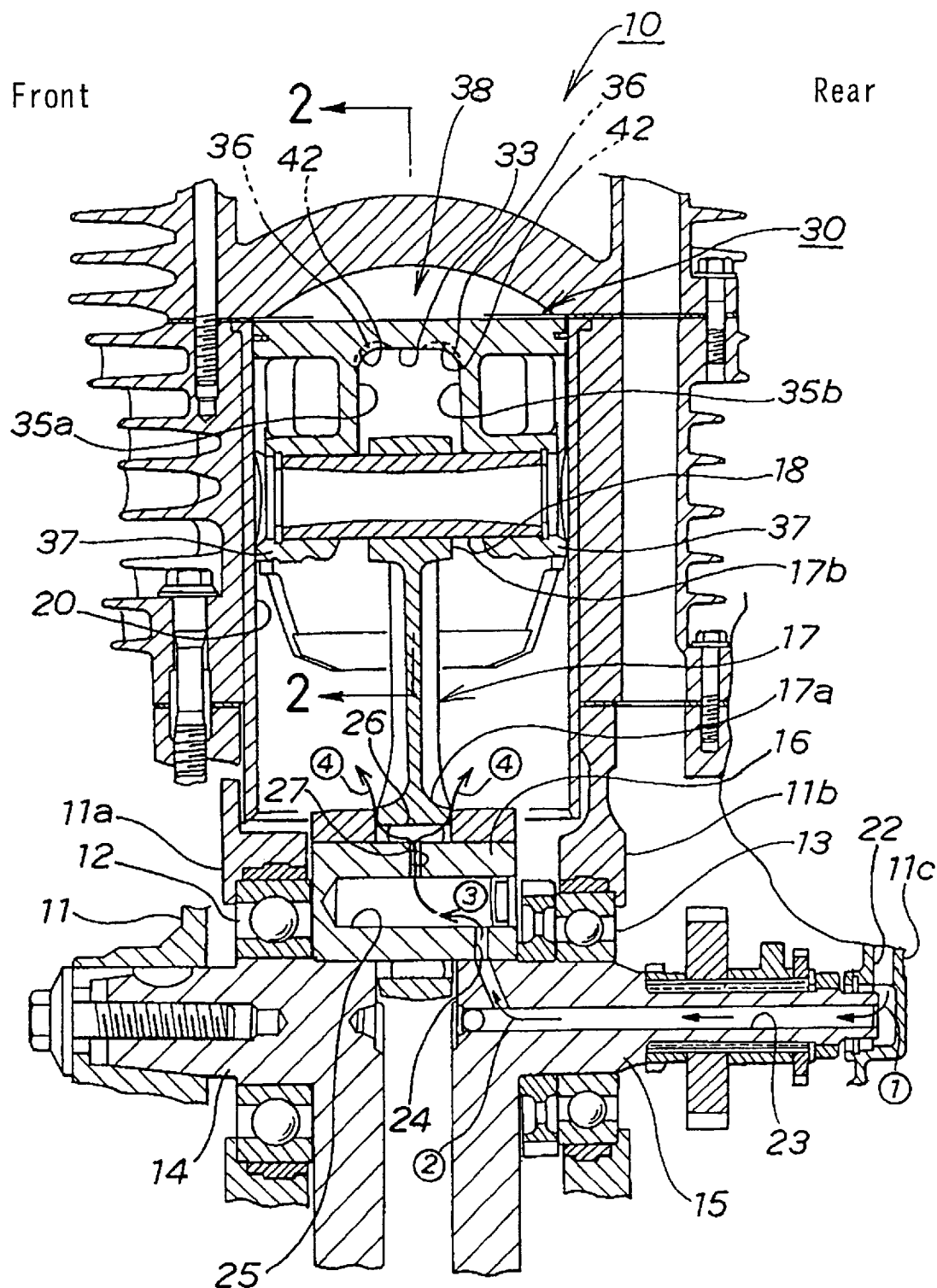
FIG. 1 shows a sectional view illustrating a piston for an internal combustion engine relating to the present invention.

An embodiment of the present invention will be explained hereinafter on the basis of the attached drawings. In the mean time, "front" and "rear" are respectively as shown in FIGS. 1–4. As illustrated in FIG. 1, an internal combustion engine 10 is provided with a front crankshaft 14 rotatably mounted on a front wall part 11a (as shown on the front side of FIG. 1) of a crankcase 11 via a radial ball bearing 12, a rear crankshaft 15 is rotatably mounted on a rear wall part 11b (shown on rear side of figure) of the crankcase 11 via a radial ball bearing 13, a large end part 17a of a connecting rod 17 is connected to the front and rear crankshafts 14 and 15 via a crank-pin 16, a small end part 17b of the connecting rod 17 is mounted on a piston 30 for an internal combustion engine via a piston pin 18, and the piston 30 for an internal combustion engine is inserted inside a cylinder 20.

The internal combustion engine 10 is provided with an oil feed passage 22 on a side wall 11c of the crankcase 11, an oil passage 23 communicates with an outlet of the oil feed passage 22 and is provided on the rear crankshaft 15. A lateral hole 24 communicating with an outlet of the oil passage 23 is provided on the crank-pin 16, an oil passage 25 communicating with the lateral hole 24 is provided in an inner part of the crank-pin 16, and a lateral hole 27 in which the oil passage 25 is opened to a bearing 26 of the large end part 17a of the connecting rod, is provided on the crank-pin 16.

Figure 2:
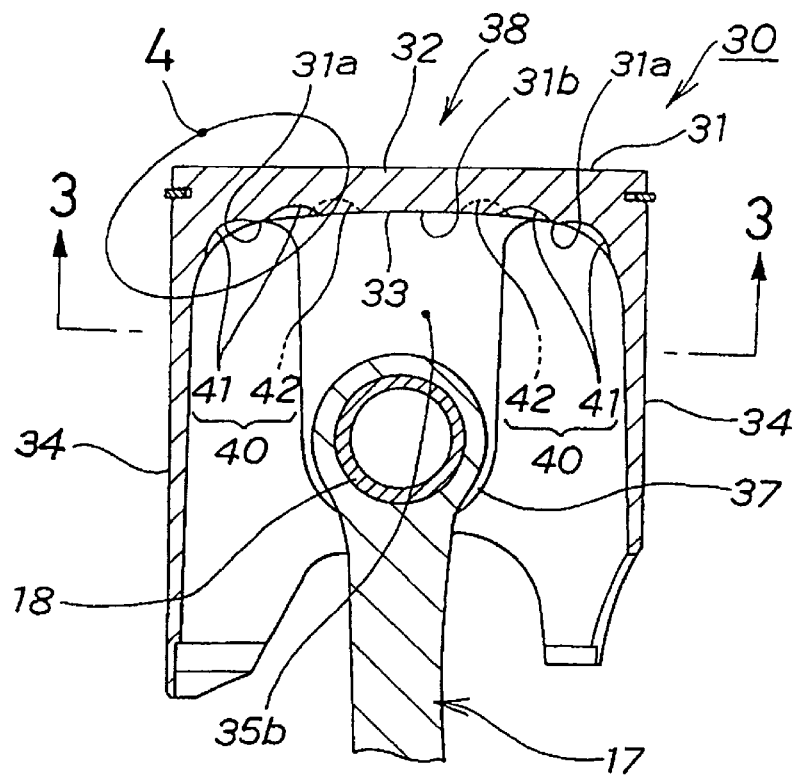
FIG. 2 shows a sectional view taken on line 2—2 in FIG. 1.

FIG. 2 shows a sectional view taken on line 2—2 of FIG. 1. The piston 30 for an internal combustion engine is constituted of a head part 31, a cylindrical skirt part 34 arranged to a lower part of the head part 31, and a pair of pin boss parts 37 (only the depth side is illustrated) formed on both opposing side walls to each other of the skirt part 34. A surface facing to a combustion chamber 38 (refer to FIG. 1) of the head part 31 is called an obverse face 32 of the head part 31. A surface on an opposing side to the combustion chamber 38 is called a reverse face 33 of the head part 31. A member formed recessed parts 40 (constituting the round recessed parts 41 and elliptic recessed parts 42) provide cross sections thereof that present smooth circular arcs on the reverse face 33 of the head part 31.

By providing recessed parts of the smooth circular arcs in cross section, when a combustion gas pressure is operated on the head part 31, stresses are prevented from concentrating to the recessed parts 40. Thereby, a crack is prevented from generating to the head part 31.

Figure 3:
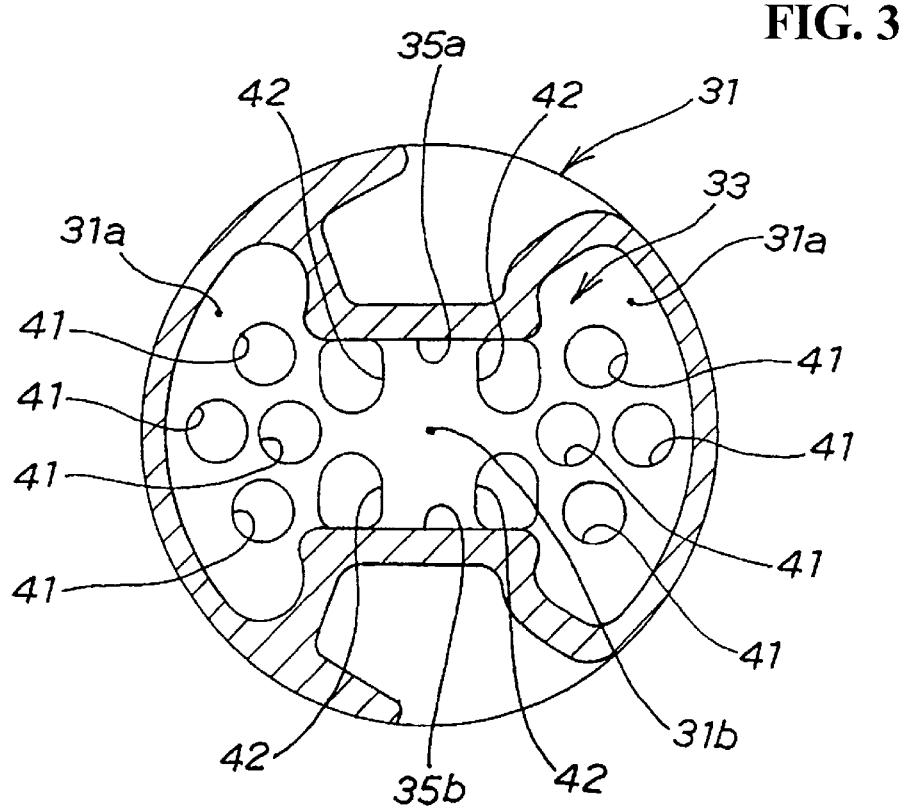
FIG. 3 shows a sectional view taken on line 3—3 in FIG. 2.

FIG. 3 shows a sectional view taken on line 3—3 in FIG. 2, and illustrates a state provided with a plurality of pieces of the recessed parts 40 (constituted of round recessed parts 41 and elliptic recessed parts 42) on the reverse face 33 of the head part 31.

A plurality of pieces of the recessed part 40 are constituted of 8 pieces of the round recessed parts 41 formed in the neighborhood of an outer peripheral part 31a of the head part 31, and the elliptic recessed parts 42 formed on inner sides (that is, portions corresponding to opposing wall surfaces 35a and 35b to each other for forming pin boss parts 37 illustrated in FIG. 1) of the round recessed parts 41, and are formed by avoiding a central part 31b of the head part 31.

Hereinafter, a reason why a plurality of pieces of the recessed parts 40 are formed in the neighborhood of the outer peripheral part 31 a while avoiding the central part 31b of the head part 31 will be explained. The outer peripheral part 31a of the head part 31 is a portion arranged to the skirt part 34 as illustrated in FIG. 2, a wall thickness in the neighborhood of the outer peripheral part 31a is thicker than that of the central part 31b. Accordingly, by forming the round recessed parts 41 in the neighborhood of the outer peripheral part 31a, the wall thickness of the outer peripheral part 31a is set close to the wall thickness of the central part 31b.

Further, at portions corresponding to opposing wall surfaces 35a and 35b to each other for forming the pin boss parts 37, by forming (refer to FIG. 1) the elliptic recessed parts 42, a thick wall part 36 (illustrated in FIG. 1) arranged from the head part 31 to the wall surfaces 35a and 35b is set close to the wall thickness of the central part 31b.

Accordingly, heat received from combustion gas when burned an air-fuel mixture inside the combustion chamber 38 can be radiated substantially uniformly and efficiently from an entire area of the head part 31.

Further, the round recessed parts 41 are arranged in the shape of a lattice in the neighborhood of the outer peripheral part 31a. With this contrivance, the round recessed parts 41 are arranged efficiently in the neighborhood of the outer peripheral part 31a, the round recessed parts 41 can be formed in 4 areas by 4 pieces in the neighborhood of the outer peripheral part 31.

In this manner, by efficiently arranging a plurality of pieces of the recessed parts on the reverse face 33 of the head part 31, the wall thickness in the neighborhood of the outer peripheral part 31a of the head part 31 can be set close to the wall thickness of the central part 31b, and a surface area of the reverse face 33 of the head part 31 can be increased.

As a result, heat received from combustion gas when burning the air fuel mixture inside the combustion chamber 38 can be radiated substantially uniformly and efficiently from the entire area of the head part 31.

In addition to that, by forming by a plurality of pieces of the recessed parts 40 in the reverse face of the head parts 31, the weight of the head part is lightened, and the weight reduction of the piston 30 for an internal combustion engine can be realized.

Figure 4:
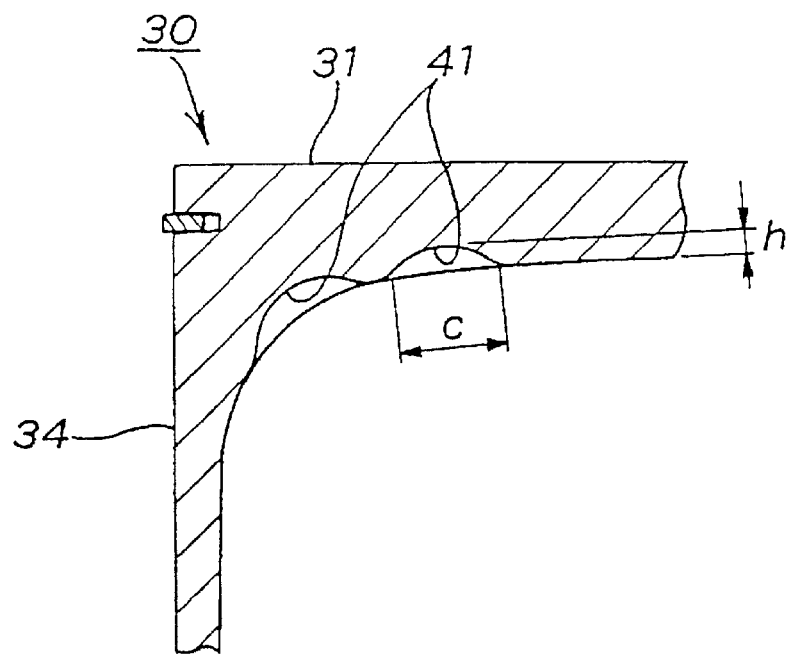
FIG. 4 shows an enlarged view of the circled area 4 section in FIG. 2.
Figure 5:
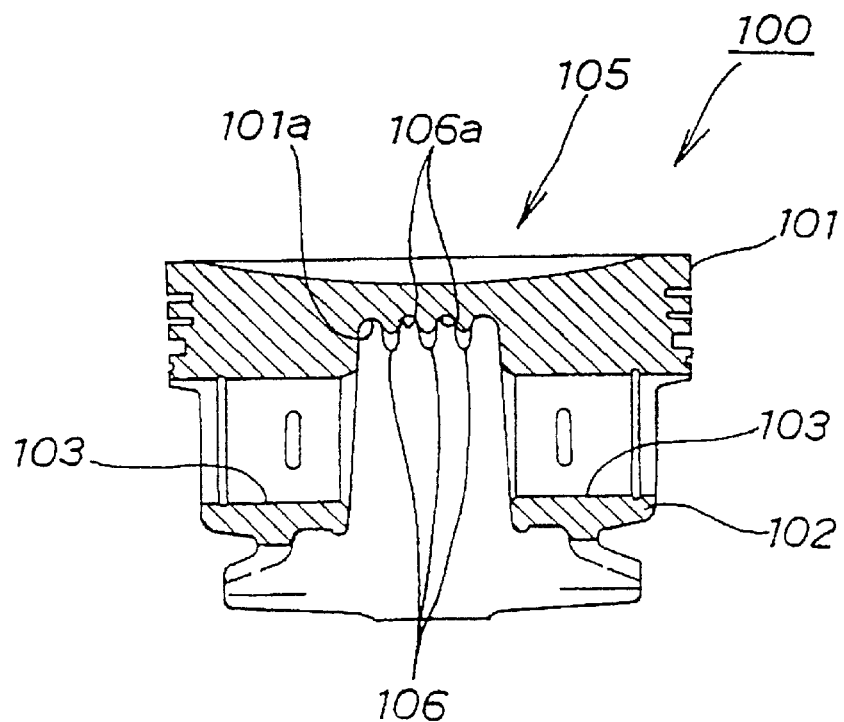
FIG. 5 shows a sectional view of a piston for a conventional internal combustion engine.

FIG. 4 shows an enlarged view of the circled area 4 section in FIG. 2, and illustrates a state where a width of the round recessed part 41 is denoted by the letter c, and a height thereof is denoted by the letter h.

The round recessed part 41 is formed such that a ratio between the width c and the height h, that is, h/c is set in a range of 0.15–0.25. When the ratio h/c is smaller than 0.15, it becomes difficult to sufficiently enlarge a surface area of the head part, and radiation of heat cannot be increased. Thus, when the ratio h/c is set equal to or more than 0.15, the radiation of heat is attempted to be increased by sufficiently enlarging the surface area of the head part.

Further, when the ratio h/c exceeds 0.25, it becomes difficult to form the cross section of the recessed part 41 in a shape being presented in a smooth circular arc and the stress can not be prevented from concentrating. Thus, by setting the ratio h/c equal to or less than 0.25, the stress is attempted to be prevented from concentrating by forming the cross section of the recessed part in the shape of a smooth circular arc.

Next, when the ratio h/c is set as 0.2, a rate of increase A of a surface area of the round recessed part 41 will be explained. Firstly, when the surface area of the round recessed part 41 is set as S1, a formula (1) is established.

$$S1=3.14(c^2/4+h^2) \quad (1)$$

Further, from the ratio h/c=0.2, a formula (2) is established.

$$H=0.2c \quad (2)$$

Accordingly, from the formula (1) and the formula (2), a formula (3) is established.

$$S1=3.14c^2(1/4+0.2^2) \quad (3)$$

On the other hand, a surface area in the case of not forming the round recessed part 41 is set as S2, a formula (4) is established.

$$S1=3.14(c^2/4) \quad (4)$$

Accordingly, the rate of increase A of the surface area, from the formula (3) and the formula (4), becomes, $$A=(S1-S2/S2)100=13\%.$$

That is, by forming round recessed parts 41, the surface area can be increased by 13%. Accordingly, heat received from combustion gas when burned the air-fuel mixture inside the combustion chamber 38 can be radiated substantially uniformly and efficiently from the entire area of the head part 31.

Next, returning to FIG. 1, an operation of the piston for an internal combustion engine will be explained. In an internal combustion engine 10, a piston 30 for an internal combustion engine is reciprocated inside the cylinder 20 by igniting and exploding mixed gas in the combustion chamber 38. Thereby, the front and rear crankshafts 14 and 15 are integrally rotated via the connecting rod 17.

Accompanied with the rotation of the front and the rear crankshafts 14 and 15, lubricating oil is discharged from a hydraulic pump (not illustrated). Lubricating oil described above flows into the oil passage 23 inside the rear crankshaft 25 as shown by an arrow mark by passing through the oil feed passage 22 of the rear wall surface part 11c. An inflow lubricating oil flows in the direction of the arrows, and enters according to the arrows into the oil passage 25 inside the crank-pin 16 by passing through the lateral hole 24 of the crank-pin 16. Lubricating oil entering into the oil passage 25, flows out on an outside of the crank-pin 16 by passing through the lateral hole 27 of the crank-pin 16.

An outflow of lubricating oil, after lubricating the bearing 26 as shown by the arrows, by receiving an influence of centrifugal force accompanied by the rotation of the front and the rear crankshafts 14 and 15, and is splashed in a shape of radiation as shown by an arrow mark along both side surfaces of the large end part 17a of the connecting rod.

A part of the splashed lubrication oil, enters inside the piston 30 for an internal combustion engine, and lubricates a piston pin 18 and the small end part 17b of the connecting rod, is sprinkled on the head part 31 (include recessed parts 40 illustrated in FIG. 2) and cools the head part 31. In this way, heat transferred on the reverse face 33 of the head part 31 from the combustion chamber 38 is radiated.

Here, as illustrated in FIG. 2 and FIG. 3, by efficiently arranging a plurality of pieces of the recessed parts 40 on the reverse face of the head part 31, the wall thickness in the neighborhood of the outer peripheral part 31a of the head part 31 is set close to the wall thickness of the central part 31b, and the surface area of the reverse face 33 of the head part 31 can be increased. As a result, heat received from the combustion gas when burning the air-fuel mixture inside the combustion chamber 38 can be radiated substantially uniformly and efficiently from the entire area of the head part 31.

In the embodiment described above, a combined example of the round recessed parts 41 and the elliptic recessed parts 42 is explained, however, it is not necessary to have this combination, for example, a plurality of the recessed parts 40 may be constituted merely by the round recessed parts 41. In addition, for example, a plurality of the recessed parts 40 may be constituted by only the elliptic recessed parts 42.

Further, the shape of a plurality of the recessed parts 40 may have a cross section thereof that is not only a recessed part presented as a smooth circular arc which is a round recessed part 41 or the elliptic recessed part 42, it may for example, take on other shapes like a frustum of circular cone may well be formed.

Further, in the embodiment described above, as for the example formed a plurality of pieces of the recessed parts 40 by avoiding the central part 31b of the head part 31 is explained, however, a portion forming the recessed part 40 can be set appropriately and optionally corresponding to a shape of piston 30 for an internal combustion engine.

Further, the round recessed parts 41 is arranged in a shape of a lattice, however, an arrangement method of the round recessed parts 41 is not necessary to this arrangement.

The present invention exhibits following effects according to the constitution descried above.

A plurality of recessed parts, cross sections thereof presenting smooth circular arcs, are formed in a surface (reverse face) on an opposing side to a combustion chamber of a head part. Therefore, the surface area of the reverse face of the head part is enlarged and the heat radiation property can be enhanced.

In addition to that, by forming a plurality of pieces of the recessed parts on the reverse face of the head part, the weight of the head part is lightened and a weight reduction of the piston for the internal combustion engine can be realized. Accordingly, fuel economy and the output for an internal combustion engine can be enhanced.

Further, by forming the cross section of the recessed part with a smooth circular arc, when a combustion gas pressure is operated to the head part, a stress is prevented from concentrating at the recessed part. Accordingly, a crack is prevented from generating in the head part.

A wall thickness of an outer peripheral part is set close to the wall thickness of a central part by forming the recessed parts in the neighborhood of an outer peripheral part of a head part. Accordingly heat received from combustion gas when burned in an air-fuel mixture inside the combustion chamber can be radiated substantially uniformly and efficiently from an entire area of the head part. In addition to that, the weight of a head part 31 is lightened, and the weight reduction of a piston 30 for an internal combustion engine can be efficiently realized.

By arranging the recessed parts in a shape of a lattice in the neighborhood of an outer peripheral part of a head part, a plurality of the recessed parts are efficiently arranged in the neighborhood of the outer peripheral part. Thus, a wall thickness in the neighborhood of the outer peripheral part of the head part can be set close to the wall thickness in the center of the head part, and a surface area of the head part can be increased.

Accordingly, heat received from the combustion gas when burning an air-fuel mixture inside a combustion chamber can be radiated substantially uniformly and efficiently from an entire area of the head part. In addition to that, the weight of the head part 31 is further lightened and a weight reduction of the piston for the internal combustion engine can be efficiently realized.

A width of a recessed part is denoted by the letter c, a height thereof is denoted by the letter h, a ratio between the width c and the height h, that is, h/c is set in a range of 0.15–0.25. By setting the ratio h/c equal to or more than 0.15, a surface area of a head part is sufficiently enlarged and enhances the radiation of heat, by setting the ratio h/c to be equal to or smaller than 0.25, by forming a cross section of the recessed part in a shape presenting a smooth circular arc, stress is prevented from concentrating.

As a result, heat is efficiently radiated from the head part when the combustion gas pressure is operated to the head part, and a crack is prevented from generating on the head part.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A piston for an internal combustion engine comprising:
    a head part;
    a cylindrical skirt part extending from a lower part of the head part;
    a pair of pin boss parts formed on opposing side walls to each other and extending inwardly from the skirt part;
    a plurality of recessed parts formed in a surface on an opposing side to a surface facing a combustion chamber of said head part in an area enclosed by the opposing sidewalls and the skirt part, said recessed parts being smooth circular arcs in cross section formed adjacent to an outer peripheral part of the head part while avoiding a central part of the head part.

2. The piston for an internal combustion engine according to claim 1, wherein said recessed parts are arranged in a shape of a lattice adjacent to the outer peripheral part of the head part.

3. The piston for an internal combustion engine according to claim 2, wherein a width of said recessed part is denoted by c and a height thereof is denoted by h, a ratio between the width c and the height h, that is, h/c is set in a range of 0.15–0.25.

4. The piston for an internal combustion engine according to claim 2, wherein a width of said recessed part is denoted by c and a height thereof is denoted by h, a ratio between the width c and the height h, that is, h/c is 0.20.

5. The piston for an internal combustion engine according to claim 1, wherein a width of said recessed part is denoted by c and a height thereof is denoted by h, a ratio between the width c and the height h, that is, h/c is set in a range of 0.15–0.25.

6. The piston for an internal combustion engine according to claim 1, wherein a width of said recessed part is denoted by c and a height thereof is denoted by h, a ratio between the width c and the height h, that is, h/c is 0.20.

7. The piston for an internal combustion engine according to claim 1, wherein a portion of said recessed parts are elliptical arcs.

8. A piston for an internal combustion engine comprising:
    a head part including an obverse face and a reverse face;
    a cylindrical skirt part extending from a lower part of the head part;
    a plurality of recessed parts formed on said reverse face of said head part in an area enclosed by opposing sidewalls and the skirt part, said recessed parts being smooth arcs in cross section formed adjacent to an outer peripheral part of the head part while avoiding a central part of the head part.

9. The piston for an internal combustion engine according to claim 8, wherein said recesses are arranged in a shape of a lattice adjacent to the outer peripheral part of the head part.

10. The piston for an internal combustion engine according to claim 9, wherein a width of said recessed part is denoted by c and a height thereof is denoted by h, a ratio between the width c and the height h, that is, h/c is set in a range of 0.15–0.25.

11. The piston for an internal combustion engine according to claim 9, wherein a width of said recessed part is denoted by c and a height thereof is denoted by h, a ratio between the width c and the height h, that is, h/c is 0.20.

12. The piston for an internal combustion engine according to claim 8, wherein a width of said recesses is denoted by c and a height thereof is denoted by h, a ratio between the width c and the height h, that is, h/c is set in a range of 0.15–0.25.

13. The piston for an internal combustion engine according to claim 8, wherein a width of said recessed part is denoted by c and a height thereof is denoted by h, a ratio between the width c and the height h, that is, h/c is 0.20.

14. The piston for an internal combustion engine according to claim 8, wherein a said recesses are circular arcs.

15. The piston for an internal combustion engine according to claim 8, wherein a said recesses are elliptical arcs.

16. The piston for an internal combustion engine according to claim 8, wherein a said recesses are a combination of circular and elliptical arcs.

17. A piston for an internal combustion engine comprising:
    a head part;
    a cylindrical skirt extending from a lower part of the head part;
    a pair of pin boss parts formed on opposing side walls to each other and extending inwardly from the skirt part;
    a plurality of recessed parts formed in a surface on an opposing side to a surface facing to a combustion chamber of said head part, said recessed parts being smooth circular arcs in cross section, wherein a width of said recessed part is denoted by c and a height thereof is denoted by h, a ratio between the width c and the height h, that is, h/c is set in a range of 0.15–0.25.

18. A piston for an internal combustion engine comprising:
    a head part;
    a cylindrical skirt extending from a lower part of the head part;
    a pair of pin boss parts formed on opposing side walls to each other and extending inwardly from the skirt part;
    a plurality of recessed parts formed in a surface on an opposing side to a surface facing to a combustion chamber of said head part, said recessed parts being smooth circular arcs in cross section, wherein a width of said recessed part is denoted by c and a height thereof is denoted by h, a ratio between the width c and the height h, that is, h/c is 0.20.

19. A piston for an internal combustion engine comprising:
   a head part;
   a cylindrical skirt extending from a lower part of the head part;
   a pair of pin boss parts formed on opposing side walls to each other and extending inwardly from the skirt part;
   a plurality of recessed parts formed in a surface on an opposing side to a surface facing to a combustion chamber of said head part, said recessed parts being smooth circular arcs in cross section, wherein a width of said recesses is denoted by c and a height thereof is denoted by h, a ratio between the width c and the height h, that is, h/c is set in a range of 0.15–0.25.

20. A piston for an internal combustion engine comprising:
   a head part;
   a cylindrical skirt extending from a lower part of the head part;
   a pair of pin boss parts formed on opposing side walls to each other and extending inwardly from the skirt part;
   a plurality of recessed parts formed in a surface on an opposing side to a surface facing to a combustion chamber of said head part, said recessed parts being smooth circular arcs in cross section, wherein a width of said recessed part is denoted by c and a height thereof is denoted by h, a ratio between the width c and the height h, that is, h/c is 0.20.

21. A piston for an internal combustion engine comprising:
   a head part;
   a cylindrical skirt extending from a lower part of the head part;
   a pair of pin boss parts formed on opposing side walls to each other and extending inwardly from the skirt part;
   a plurality of recessed parts formed in a surface on an opposing side to a surface facing to a combustion chamber of said head part, said recessed parts being smooth circular arcs in cross section, wherein a said recesses are a combination of circular and elliptical arcs, the round recessed parts being formed in the neighborhood of an outer peripheral part of the head part, and the elliptical recessed parts being formed on inner sides near opposing wall surfaces.

* * * * *